United States Patent [19]

Beeler

[11] Patent Number: 4,612,693

[45] Date of Patent: Sep. 23, 1986

[54] HYDRAULIC SERVICING APPARATUS

[76] Inventor: James E. Beeler, 7400 Wellman Rd., Parma, Mich. 49269

[21] Appl. No.: 658,797

[22] Filed: Oct. 9, 1984

[51] Int. Cl.[4] ............ B23P 19/02

[52] U.S. Cl. ............ 29/251

[58] Field of Search ............ 29/251, 252

[56] References Cited

U.S. PATENT DOCUMENTS

| | | | |
|---|---|---|---|
| 3,103,064 | 9/1963 | Hawkins | 29/252 |
| 3,111,752 | 11/1963 | Simmons | 29/252 |
| 3,283,699 | 11/1966 | Hawkins | 29/251 X |
| 3,307,830 | 3/1967 | Van Allen | 29/251 X |
| 3,359,618 | 12/1967 | Murphy | 29/251 X |
| 3,373,474 | 3/1968 | Doerer | 29/252 X |
| 3,503,327 | 3/1970 | Lenz | 29/251 X |
| 3,711,925 | 1/1973 | Mazer | 29/252 |
| 3,880,604 | 4/1975 | Hawkins | 29/252 |
| 4,003,305 | 1/1977 | King | 29/251 X |

*Primary Examiner*—Frederick R. Schmidt
*Assistant Examiner*—Steven P. Schad
*Attorney, Agent, or Firm*—Beaman & Beaman

[57] ABSTRACT

A hydraulic press for servicing and repairing parts, particularly suitable for automobile service work, comprising spaced parallel vertical columns having a top plate and a lower vertically adjustable plate for supporting a conventional hydraulic bottle jack. The top plate includes anvil apparatus including spaced parallel vertically adjustable work engaging supports located on opposite sides of a compression rod translated by the jack. The press is characterized by its ease of fabrication and versatility.

4 Claims, 6 Drawing Figures

HYDRAULIC SERVICING APPARATUS

BACKGROUND OF THE INVENTION

Presses using hydraulic bottle jacks are known, and typical devices are shown in U.S. Pat. Nos. 3,103,064; 3,111,752; 3,359,618 and 3,373,474.

Such devices as shown in the above patents commonly employ vertical columns, work holders and compression or tension rods operatively associated with the jack piston. However, known presses of this type, as used for general purposes, have not been as versatile in use as desired or of such construction as to minimize the cost of manufacture and assembly.

It is an object of the invention to provide a press utilizing a hydraulic bottle jack wherein the press construction is of a simplified nature readily lending itself to fabrication by cutting and welding conventional structural elements.

Another object of the invention is to provide a press utilizing a hydraulic bottle jack operatively associated with a compression rod wherein work piece anvil means are adjustably defined on the press capable of versatile positioning to readily accommodate a wide variety and configuration of parts to be serviced.

A further object of the invention is to provide a press utilizing a hydraulic bottle jack wherein a plurality of compression rods may be selectively used with the press, and such rods are of economical construction and may be readily fabricated for accommodation of various types of work pieces.

In the practice of the invention the press is constructed of conventional structural elements and fabricated by arc welding. A pair of spaced columns are formed of U-beams, and a top plate is welded to the upper end of the columns, and a base plate affixed to the columns' lower end. A bottle jack of the hydraulic type is located upon a support plate bridging the columns, and a plurality of vertically spaced holes defined in the columns receive pins for adjustably vertically locating the jack plate.

The work engaging structure is defined on the top plate and includes a stationary pad affixed to the underside of the top plate, and a pair of threaded shafts or stops defined upon opposite sides of a hole formed in the top plate in axial alignment with the jack piston. The threaded shafts may be independently adjusted to accommodate different configurations of a work piece, and the lower ends of the shafts are formed with work piece engaging pads.

A compression rod, selectively suspended from the top plate permits pressure to be transferred from the jack to the part being worked upon, and the compression rod includes a transverse shoulder for receiving bushings and similar work engaging components.

The opening within the top plate in alignment with the jack piston is of such diameter as to accommodate relatively large elongated objects, such as an automobile axle, and a bushing is employed with this opening to accurately locate the compression rod therein when the compression rod is used. The press of the invention is highly versatile in use, and its simple construction facilitates fabrication at reasonable costs.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 2:
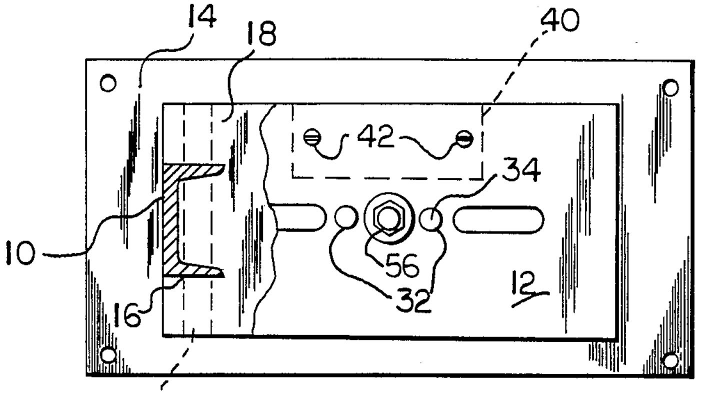
FIG. 2 is a top plan view of the press of FIG. 1.
Figure 1:
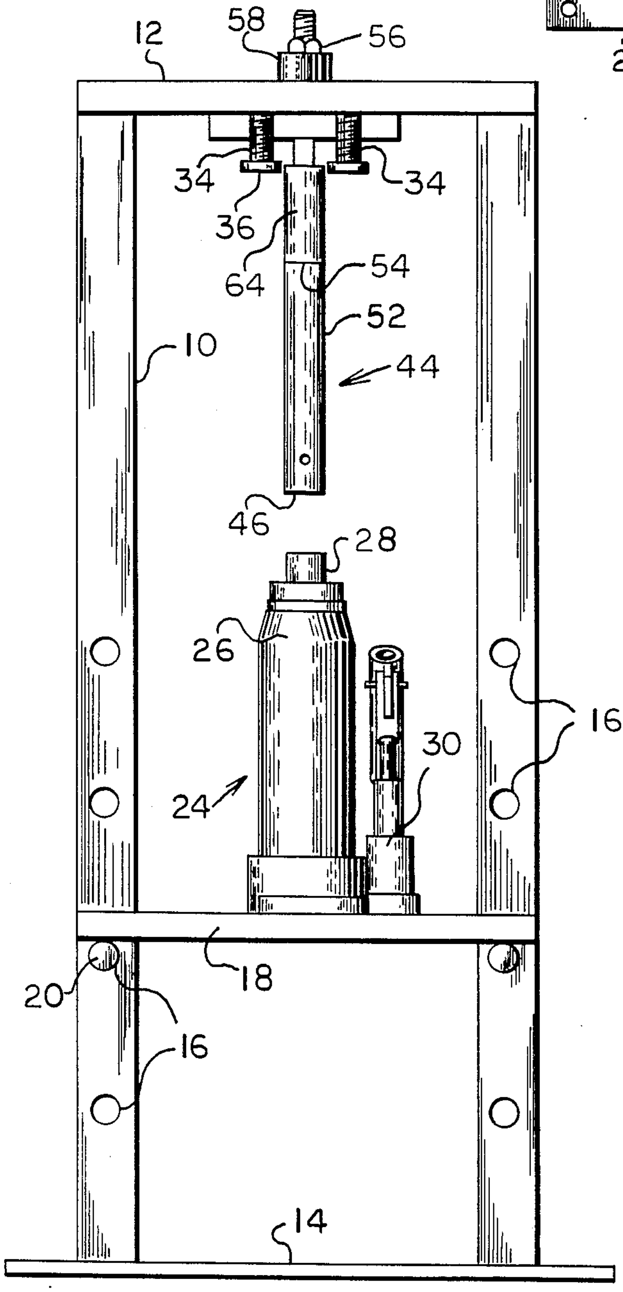
FIG. 1 is an elevational view of a press in accord with the invention, the bottle jack piston being fully retracted.

The frame of the press includes a pair of spaced, parallel vertically oriented columns 10 connected at their upper ends by a top plate 12 welded thereto, and interconnected at their lower ends by a base plate 14 upon which the columns rest. The columns are formed of conventional structural components, such as channel beams, and are electrically welded to the plates 12 and 14.

A plurality of holes 16 are drilled in the legs of each column in vertically spaced relationship, and the holes of the columns are horizontally related wherein the jack support plate 18 may selectively rest upon pins 20 inserted through horizontally aligned holes 16, and in this manner the holes and pins will vertically position the support plate 18 as desired.

The support plate 18 is notched at 22 at each end to receive the columns, FIG. 2, and in this manner the support plate is guided for vertical adjustment between the columns. The support plate 18 is readily vertically positioned merely by removing the pins 20 from one set of horizontally aligned holes and reinserting the pins at another vertical location of holes 16.

A conventional hydraulic jack 24 is mounted upon the support plate 18, and the bottle jack includes the usual cylinder 26 in which the vertically oriented piston 28 extends or retracts as the cylinder is pressurized by the manually operated pump 30, as well known.

The top plate 12 serves to support the work holder or anvil, and this structure includes threaded holes 32 receiving the threaded stops or shafts 34. The shafts 34 are each provided at their lower end with a work engagable pad 36, and by means of the threads the threaded stop shafts may be vertically oriented as desired.

The threaded stop shafts 34 are located upon the opposite sides of an opening 38 coaxial with the piston axis of the bottle jack 24, and the opening 38 is of a relatively large diameter as to receive the drive axle of an automobile or truck.

A metal pad 40 is affixed to the underside of the top plate 12 by screws 42, and the underside of the pad 40 may serve as a fixed workpiece engagement surface during press operation.

Upward forces of the bottle jack are normally applied to the part being serviced by a compression rod 44 having a lower end 46 which is engaged by the jack piston 28, and the upper end 48 of the compression rod extends through the opening 38. The upper region 50 of the rod is of a lesser dimension than the lower region 52 wherein a radial shoulder 54 is defined at the transition of the rod regions, and the upper end of the rod is threaded to receive a nut 56.

A bushing collar 58 having a reduced cylindrical portion 60 adapted to be received within the top plate opening 38 includes a bore 62 slidably receiving the rod region 50, and in this manner the bushing collar 58 permits the rod 44 to suspend therefrom. Bushings 64, of various lengths and diameters, may be inserted upon the compression rod region 50 for engagement with the shoulder 54 to permit the compression forces of the rod to be transferred to the part being serviced.

Figure 3:
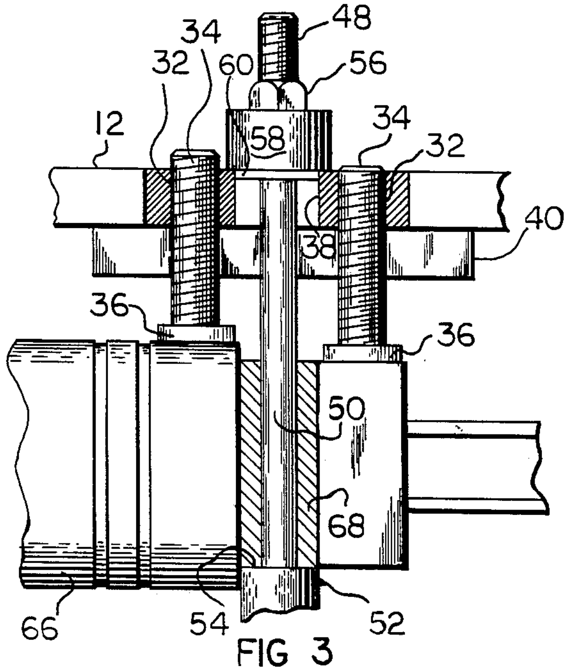
FIG. 3 is an enlarged, detail, elevational, partially sectioned view of the press top plate and work engaging anvil structure.
Figure 4:
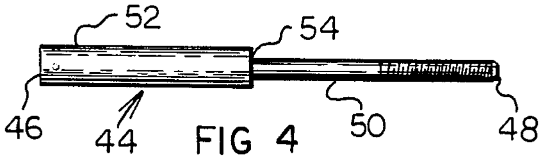
FIG. 4 is an elevational view of the compression rod, per se.
Figure 6:
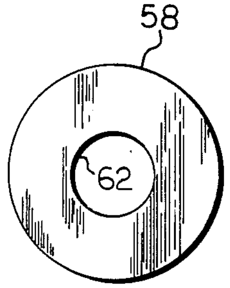
FIG. 6 is an end view of the bushing collar as taken from the left of FIG. 5.
Figure 5:
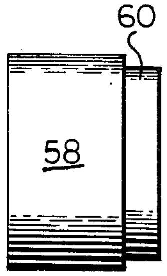
FIG. 5 is an elevational view of the bushing collar associated with the compression rod.

FIG. 3 illustrates a typical service application wherein an engine piston 66 is illustrated and the tubular wrist pin 68 is being removed therefrom. The compression rod portion 50 extends through the piston wrist pin, the shoulder 54 engages the lower end of the wrist pin, and the shafts 34 and pads 36 are vertically adjusted to engage surfaces of the piston to orient the piston in such a manner that the wrist pin is parallel with the compression rod axis. Upon pressurizing of the jack 24, the rod 44 is translated upwardly producing an upward force upon the wrist pin 68 to receive the same from the piston or install the wrist pin, as desired.

If the lower surfaces of the threaded shaft pads 36 are adjusted to align with the lower surface of the pad 40, a three point support surface for a part being serviced is defined.

The vertical adjustability of the threaded stop shafts 34 produces a universal versatility, and the use of the bushing collar 58 further increases the versatility of the press permitting large size shafts to be inserted through the top plate opening 38.

As will be appreciated, fabrication of the components of the press of the invention is readily achieved, as is assembly of the press, and the relationship of components provides an inexpensive press capable of a wide variety of uses.

It is appreciated that various modifications to the inventive concepts may be apparent to those skilled in the art without departing from the spirit and scope of the invention.

I claim:

1. A press characterized by its economy of construction and ease of operation comprising, in combination, a frame comprising a pair of spaced, parallel, vertically disposed columns having upper and lower ends, a top plate interconnecting said columns' upper ends having a lower surface, a base plate interconnecting said columns' lower ends, a jack support plate bridging said columns, vertically adjustable jack support plate mounting means defined upon said columns, a hydraulic jack mounted upon said jack support plate having a piston defining a vertical axis of operation, part anvil means defined upon said top plate adapted to engage a part to which force is applied thereto by said jack, said anvil means including a vertical axis in alginment with said jack axis, a pair of independently operated vertically adjustable stops mounted upon said top plate on opposite sides of said anvil axis and extending through said top plate lower surface toward said jack support plate, said stops each comprising threaded shafts having lower ends and a part engaging pad defined upon said lower end of said shafts, an opening defined in said top plate in alignment with said anvil means axis, and a compression rod received within said opening for vertical movement therein, said rod having a lower region having a lower end engagable by said jack piston.

2. In a press as in claim 1, said compression rod having an upper end region slidably extending through said top plate opening, said upper end region being of a diameter less than that of said rod lower region, a radial shoulder defined at the transition of said rod upper and lower regions, the force of said jack being transferred through said shoulder, threads defined upon said upper end region of said compression rod, a nut threaded upon said threads, a bushing collar mounted upon said top plate having a bore coaxial with said opening, said rod upper end region being slidably received within said collar bore for guidance by said bore, said nut engaging said collar to limit downward movement of said rod.

3. In a press as in claim 2, said bushing collar including a concentric cylindrical boss received within said top plate opening to maintain said bushing collar concentric to said opening.

4. In a press as in claim 1, a pad affixed to said top plate lower surface adjacent and to one side of said anvil axis having a lower surface, said pad lower surface being selectively engagable by a part within said press whereby predetermined adjustment of said threaded shafts relative to said pad lower surface permits three-point support of the part.

* * * * *